US011811707B2

(12) United States Patent
De et al.

(10) Patent No.: US 11,811,707 B2
(45) Date of Patent: Nov. 7, 2023

(54) AUTOMATIC CHATBOT GENERATION THROUGH CAUSAL ANALYSIS OF HISTORICAL INCIDENTS

(71) Applicant: International Business Machines Corporation, Armonk, NY (US)

(72) Inventors: Radha Mohan De, Howrah (IN); Sujoy Roy, Kolkata (IN); Krishnendu Chowdhury, Howrah (IN)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 17/380,386

(22) Filed: Jul. 20, 2021

(65) Prior Publication Data

US 2023/0028408 A1    Jan. 26, 2023

(51) Int. Cl.
*H04L 51/02* (2022.01)
*G06N 20/00* (2019.01)
*G06F 16/335* (2019.01)
*G06F 16/35* (2019.01)
*G06F 16/332* (2019.01)

(52) U.S. Cl.
CPC ............ *H04L 51/02* (2013.01); *G06F 16/335* (2019.01); *G06F 16/3329* (2019.01); *G06F 16/35* (2019.01); *G06N 20/00* (2019.01)

(58) Field of Classification Search
CPC ... H04L 51/02; G06F 16/3329; G06F 16/335; G06F 16/35; G06N 20/00
USPC .......................................................... 709/206
See application file for complete search history.

(56) References Cited

U.S. PATENT DOCUMENTS

| | | | |
|---|---|---|---|
| 2014/0214744 A1* | 7/2014 | Froelich | G06N 5/02 706/46 |
| 2019/0206402 A1 | 7/2019 | Shukla | |
| 2019/0349321 A1* | 11/2019 | Cai | G06F 40/237 |
| 2020/0059558 A1 | 2/2020 | Mazza | |
| 2020/0105255 A1 | 4/2020 | Huang | |
| 2020/0342032 A1 | 10/2020 | Subramaniam | |
| 2020/0412599 A1 | 12/2020 | Misra | |
| 2021/0326531 A1* | 10/2021 | Kumar | G06F 40/279 |

\* cited by examiner

*Primary Examiner* — Emmanuel L Moise
*Assistant Examiner* — Zia Khurshid
(74) *Attorney, Agent, or Firm* — David B. Woycechowsky

(57) ABSTRACT

A method for receiving a historical incident data set with the historical incident data set including a plurality of data records, for each given data record of the plurality of data records, applying a causal analysis algorithm to determine a set of causal factor(s) for the historical instance of an incident corresponding to the given data record to obtain a problems and solutions data set, and automatically, and by machine logic, generating a chatbot based, at least in part, on the problems and solutions data set.

2 Claims, 5 Drawing Sheets

SCREENSHOT 400

PROBLEM SOLUTION DATA SET

(1) NO DIAL TONE
    (A) MAKE SURE THAT YOUR TELEPHONE BILL IS PAID
    (B) CONSULT WEBSITE TO CHECK FOR LOCAL OUTAGES (2) CROSSTALK
    (A) CALL A REPRESENTATIVE TO REPORT CROSSTALK
    (B) REPORT CROSSTALK THROUGH PHONE CO. WEBSITE
    (C) REPORT CROSSTALK AT LOCAL PHONE CO. BRANCH OFFICE (3) BROKEN TELEPHONE RECEIVER HARDWARE
    (A) BUY NEW HARDWARE AT A LOCAL STORE
    (B) ORDER NEW HARDWARE OVER THE INTERNET
    (C) SWITCH TO A VOICE OVER IP (VOIP) PLAN
        IN ORDER TO USE YOUR COMPUTER AS A
        TELEPHONE

FIG. 4

AUTOMATIC CHATBOT GENERATION THROUGH CAUSAL ANALYSIS OF HISTORICAL INCIDENTS

BACKGROUND

The present invention relates generally to the field of chatbots and more particularly to generation of new chatbots.

The Wikipedia entry for "Chatbot" (as of Jun. 16, 2021) states, in part, as follows: "A chatbot is a software application used to conduct an on-line chat conversation via text or text-to-speech, in lieu of providing direct contact with a live human agent. Designed to convincingly simulate the way a human would behave as a conversational partner, chatbot systems typically require continuous tuning and testing, and many in production remain unable to adequately converse or pass the industry standard Turing test. The term "ChatterBot" was originally coined by Michael Mauldin (creator of the first Verbot) in 1994 to describe these conversational programs. Chatbots are used in dialog systems for various purposes including customer service, request routing, or information gathering. While some chatbot applications use extensive word-classification processes, natural language processors, and sophisticated AI, others simply scan for general keywords and generate responses using common phrases obtained from an associated library or database. Most chatbots are accessed on-line via website popups or through virtual assistants. They can be classified into usage categories that include: commerce (e-commerce via chat), education, entertainment, finance, health, news, and productivity." (footnote(s) omitted)

SUMMARY

According to an aspect of the present invention, there is a method, computer program product and/or system that performs the following operations (not necessarily in the following order): (i) receive historical incident data set with the historical incident data set including a plurality of data records respectively corresponding to historical instances of various types of incidents; (ii) for each given data record of the plurality of data records, applying a causal analysis algorithm to determine a set of causal factor(s) for the historical instance of an incident corresponding to the given data record to obtain a problems and solutions data set that includes information indicative of a plurality of incident types and a set of corrective action(s) corresponding to each incident type; and (iii) automatically, and by machine logic, generating a chatbot based, at least in part, on the problems and solutions data set.

BRIEF DESCRIPTION OF THE DRAWINGS

FIG. 4 is a screenshot view generated by the first embodiment system; and

DETAILED DESCRIPTION

Figure 1:
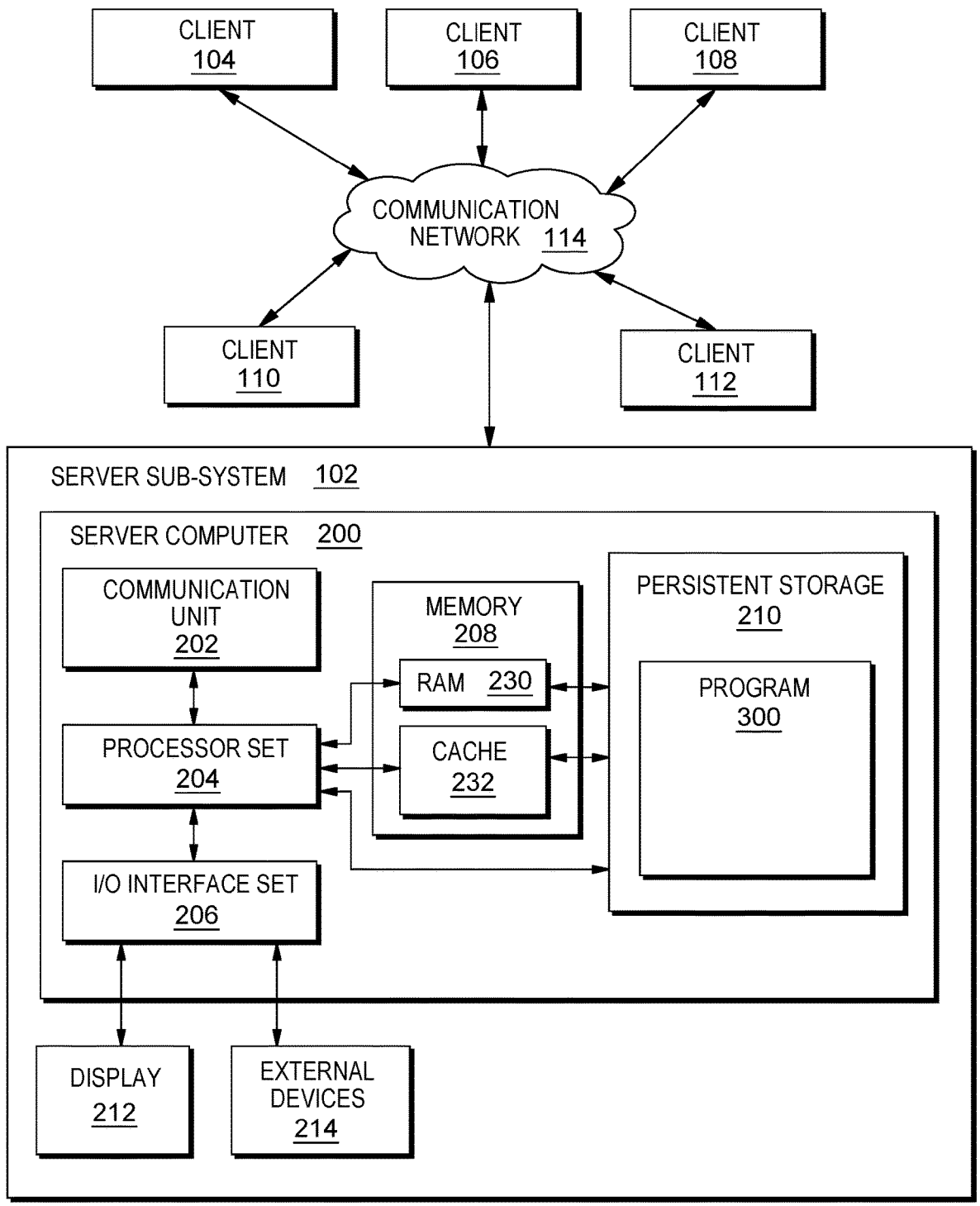
FIG. 1 is a block diagram view of a first embodiment of a system according to the present invention.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
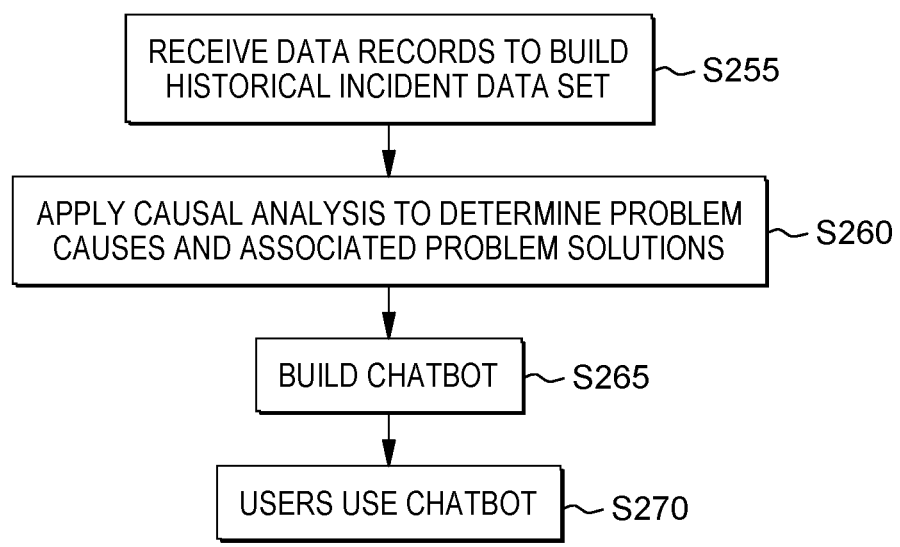
FIG. 2 is a flowchart showing a first embodiment method performed, at least in part, by the first embodiment system.
Figure 3:
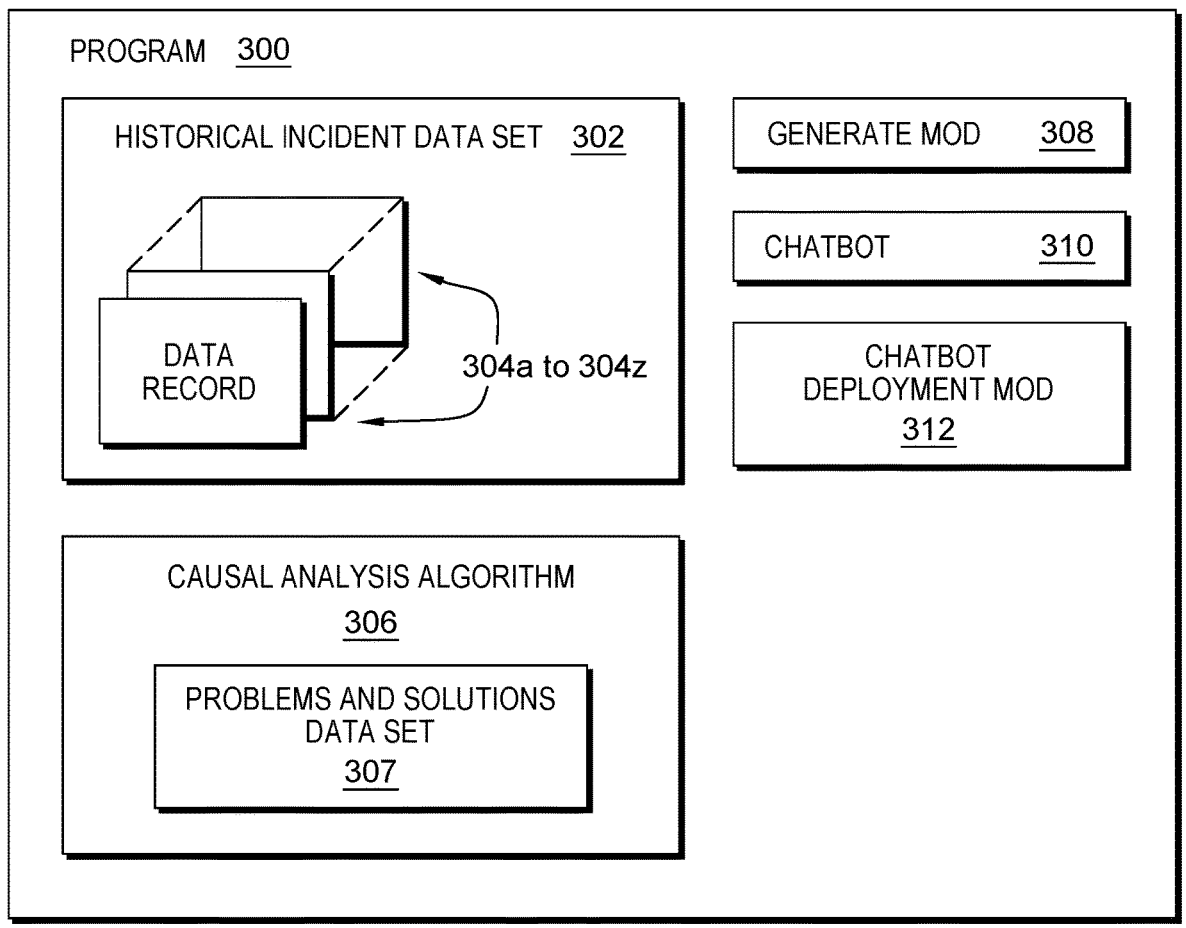
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins at operation S255, where historical incident data set 302 is received by program 300. The historical incident data set includes data records 304a to 304z. Each data record 304a to z, respectively corresponds to a historical instance of an "incident." An "incident," as the term is used herein, is any issue, question, problem or challenge where a human user might reasonably use a chatbot to help formulate and/or take corrective action. In this example, and as shown in screenshot 400 of FIG. 4, there are three incident types (all relating to issues potentially encountered with land line telephones): (i) no dial tone; (ii) crosstalk from other telephone conversations; and (iii) telephone receiver hardware is broken. In this example, the various historical data records are received from the various client subsystems 104, 106, 108, 110 and 112.

Processing proceeds to operation S260, where causal analysis algorithm 306 is applied to data records 304a to z to determine to obtain problems and solutions data set 307 that includes information indicative of a plurality of incident types and a set of corrective action(s) corresponding to each incident type. As shown in screenshot 400, there is a set of corrective action(s) for each incident type, as determined by algorithm 306.

Processing proceeds to operation S265, where generate module 308 automatically, and by machine logic, builds chatbot 310 based, at least in part, on the problems and solutions data set previously determined at operation S260.

Processing proceeds to operation S270, where various users (not shown in FIG. 1) use chatbot 310, under the guidance and control of chatbot deployment module 312, to help resolve instances of issues they are having with respect to the issue types for which the new chatbot has been generated (in this example, no dial tone, crosstalk, broken receiver hardware).

III. Further Comments and/or Embodiments

The following three (3) paragraphs describe embodiments of the present invention that recognize the following facts, potential problems and/or potential areas for improvement with respect to the current state of the art.

The use of interactive chatbots are quite common in customer support nowadays and almost all organizations are employing chatbots to resolve commonly encountered customer problems quickly. It is estimated that in 2020, 25% of customer service used chatbot based customer support agents. However, research revealed the number of chatbots currently available to support typical organization problems are not quite adequate, in fact, they are very limited. Only a very small set of typical customer problems are translated into chatbots, the rest of the cases are still routed to human agents for analysis and resolution.

The main reason for this inadequacy is inherent in the sheer complexity involved in identifying the use case and translating that to human like interactive conversation flow. The design of the conversation flow, popularly known as dialog design, is largely dependent on the sophisticated technology of using AI (artificial intelligence) to drive the conversation through intent of a spoken text, that is, a single intent can be expressed in multiple ways. Thus, the dialog design is not easy and requires a lot of time to discover, design, validate and implement the intent based interaction.

Any successful implementation of chatbot requires equal and earnest participation from domain SMEs (subject matter experts), that is, experienced customer agents, to elaborate on the typical variations of the issue and the common resolution flow to handle the same. This is known as SOP (standard operating procedure) for that issue. Typically, in chatbot development, developers are provided with this SOP and then design and develop the chatbot accordingly. But with the huge number of incoming incidents, no organization is able to spare enough support agents to do this analysis and support the chatbot development accordingly. 102

Some embodiments of the present invention may include one, or more, of the following operations, features, characteristics and/or advantages: (i) discloses a methodology for generating chatbots automatically through causal analysis of historical incidents as captured and maintained in the Incident Management System (IMS) of an organization; (ii) chatbots can play the effective role of a support agent and help the organization to manage customer support with a smaller number of support agents; (iii) uses clustering technique to categorize similar incidents and then applies causal analysis to identify correct Q&A (question and answer) flow that leads to a successful remediation; (iv) the correct flow gets translated into appropriate dialog that constitutes the core of a chatbot; and/or (v) no SME (subject matter expert) involvement is required in this process and serves the present industry needs perfectly.

Some embodiments of the present invention recognize the following facts, potential problems and/or potential areas for improvement with respect to the current state of the art: (i) currently existing technology relies on voice call transcripts between the customer and the support agents and dynamic intent discovery to generate the chatbots; (ii) there is one hidden advantage of the above approach, that is, voice call transcripts are already in dialogue form, so no effort is required to construct the flow; and/or (iii) the only important process is the extraction of the intent from each interaction.

In reference to the above paragraph, some embodiments of the present invention recognize the following facts, potential problems and/or potential areas for improvement with respect to the current state of the art concerning two (2) glaring limitations which make it unsuitable for present industry needs: (i) it will only work where all the incidents are captured through a voice call and the transcript is generated accordingly. In fact, it will not work even with a mixed system where both voice and mail approach are followed/used to accept customer requests; and/or (ii) root cause analysis investigative actions are not elaborated in the voice call, thus the subsequent transcripts lack the valuable information to produce full action flow details for the same. This may work for addressing customer "HOW-TO" kind of queries but is not appropriate for other kinds of customer issues.

Some embodiments of the present invention may include one, or more, of the following operations, features, characteristics and/or advantages: (i) action flow generation is derived from the causal flow as evident in the incident history; (ii) almost all organizations are using IMS to capture incidents; (iii) no matter whether the incident is raised from a voice channel or a mail channel, all information details, as well as action history, will be present in the incident history; and/or (iv) any causal graph generated will be complete in nature, capturing not only the interactive details but also the action details which are pertinent for an effective automation chatbot which can take serious resolution actions apart from answering customer's "HOW-TO" queries.

Some embodiments of the present invention may include one, or more, of the following operations, features, characteristics and/or advantages: (i) uses a unique mechanism to detect and construct a dialog-action flow from the causal analysis of historical incidents; (ii) the dialog-action is used to construct the chatbot accordingly; (iii) uses a unsupervised ML (machine learning) method for clustering similar problems in different buckets and then uses a comparative study of positive and negative causal graph of category of the problem to detect the variant parts; and/or (iv) problem nodes are identified and finally uses a shortest path algorithm to detect the key resolution path that will lead all customer interaction flow to a common resolution point.

Some embodiments of the present invention may include one, or more, of the following operations, features, characteristics and/or advantages: (i) a continuous checking/improvement mechanism will be used to change the chatbot dialog flow dynamically with changing business process/policies pertaining to customer incidents; (ii) the chatbot will act in a retrospective way of searching the last known application status for which the user is reporting after forming the causal graph and restoring back that state for the user; and/or (iii) searches for the other active users who use these applications with similar access rights or permission from the same group and will replicate the last known active and working state for one of the users to the enquired person.

A method according to an embodiment of the present invention includes the following operations (not necessarily in the following order): (i) apply a unsupervised clustering technique to categorize similar problems in individual buckets; (ii) select positive (where at the end the customer is happy) and negative (where customer is unhappy) cases from each buckets; (iii) construct a causal graph for both positive and negative cases; (iv) treat agent response to a user query as cause for subsequent effect where customer answers can be used to identify the edge between the cause and effect graph thus generated; (v) identify the common paths between the positive and negative cases which will help to identify the variant parts of the negative cases and each such variation will have appropriate causal pointers for those variations; (vi) once the causal pointers of the variant nodes are identified, construct a new causal graph by removing the selected causal pointers, that is, as problematic causal pointers are removed from the graph, this will trace back to a successful case; (vii) identified successful causal graph needs further optimization by removing cycles from the graph; (viii) any conflict in path joins can be resolved by following Dijkstra Shortest Path algorithm to move from one node to the other; and (ix) all the causal nodes as captured in the causal graph will be translated into "intents" and effect will be used to construct the action part of the chatbots.

Some embodiments of the present invention may include one, or more, of the following operations, features, characteristics and/or advantages: (i) once the action path has been constructed, it searches for the related users and the application last known to be active and in a working state; (ii) in the case where success is found, the state which is less than the threshold time for that application will fetch that state and replicate the same for the requested party with consent; (iii) once deployed, each chatbot interaction result will be monitored and the variation (chatbot case vs. human agent case) in the customer response will be measured against the known intents that was identified earlier; (iv) any new intents will be resampled and accommodated in the same way as mentioned in the paragraph above; and/or (v) any change in the business process can be automatically be accommodated in the subsequent chatbot without any manual intervention.

Some embodiments of the present invention may include one, or more, of the following operations, features, characteristics and/or advantages: (i) generate chatbots (dialog-action flow) by constructing a causal graph from historical incidents; (ii) performs automatic updating and optimization of chatbot flow based on runtime comparison of human/chatbot incident variation of similar cases; and/or (iii) automatic restoration of the user application by means of using the last known state of the running state of the application.

Some embodiments of the present invention may include one, or more, of the following operations, features, characteristics and/or advantages: (i) analyses incidents from incident management systems to explore incident notes to understand problems and user feedback on resolution, as negative and positive; (ii) to form a causal graph, takes out best of breed dialog-action pair to address an incident; (iii) dialog-action sets are enabling automatically generated chatbots to address user queries and problems in similar incidents; and/or (iv) analyses incidents from incident management systems to generate a causal graph and dialog-action sets from the same to empower an automatically created chatbot to address user queries and saves cost for manual support.

Some embodiments of the present invention may include one, or more, of the following operations, features, characteristics and/or advantages: (i) analyses conversation logs in real-time and historic logs to form a dialog graph to help chatbots find the next action in upcoming similar types of incidents; (ii) has a means to find positive or negative feedbacks from a user who interacts with the chatbot; (iii) applies a causal graph to find the shortest path for reaching query resolution through the best possible paths using positive edges of the causal graph; and/or (iv) analyses incidents from incident management systems to generate a causal graph and dialog-action sets, from the same, to empower an automatically created chatbot to address user queries which saves cost verses using manual support.

Some embodiments of the present invention may include one, or more, of the following operations, features, characteristics and/or advantages: (i) generates sets of dialog-action by analyzing incident history and making a causal graph to empower an automatically generated chatbot to face a customer query against an incident; (ii) uses a causal graph on incident types and subdivides its user feedback for resolution, in terms of positive and negative, to find the best sets of dialog-action to reach a resolution for a new incident via its positive edges in the causal graph; (iii) doesn't rely solely on a causal graph; and/or (iv) refines the causal graph by sorting out edges (as actions) with a positive set of attributes that contributes positively in resolving incidents and secures customer satisfaction.

Some embodiments of the present invention may include one, or more, of the following operations, features, characteristics and/or advantages: (i) scans incident records from incident management systems to apply causal analysis; (ii) detects suitable tasks for chatbots to replace human support agents by assisting automatic chatbots with dialog-action sets to handle customer incidents that match at least one or more historical incident records; (iii) refreshes knowledge-base of the chatbot, where all the latest changes in organization policies, customer handling methods, and any other changes at an organization level that may affect the customer, are reflected in the dialog-action sets; (iv) dialog-action sets actually represent standard operating procedures, derived of positive causal graphs, which extends the confidence level to satisfy customers via automatic chatbot service; and/or (v) any unknown knowledge coming from customer interactions, or via chatbot, are also getting included in the knowledge enrichment process which in turn enhances the power of the chatbots.

Some embodiments of the present invention may include one, or more, of the following operations, features, characteristics and/or advantages: (i) incidents, defects and historical records of interactions between support agents and customers, in large organizations, are analyzed to find dialog-action sets to automatically produce chatbots on demand for customer support to replace human support, which saves costs; and/or (ii) classifies incidents in terms of their semantic similarities, customer feedback (positive or negative) to apply causal analysis and find the best dialog-action sets that lead to resolution of an incident with positive feedback.

Some embodiments of the present invention may include one, or more, of the following operations, features, characteristics and/or advantages: (i) performs automatic production of chatbots, on the fly, when a matching incident appears to a customer support system and the system has dialog-action sets for such incidents in its machine learning models; (ii) updates and optimizes chatbot performance by using continuous learning from new incident handling techniques and adopting enterprise policies; (iii) restores the last known good state of the application, in some cases, to help rectify erroneous customer actions as a result from chatbot interactions; and/or (iv) produces chatbots on the fly instead of supporting an existing chatbot to sharpen its skills and power.

Figure 5:
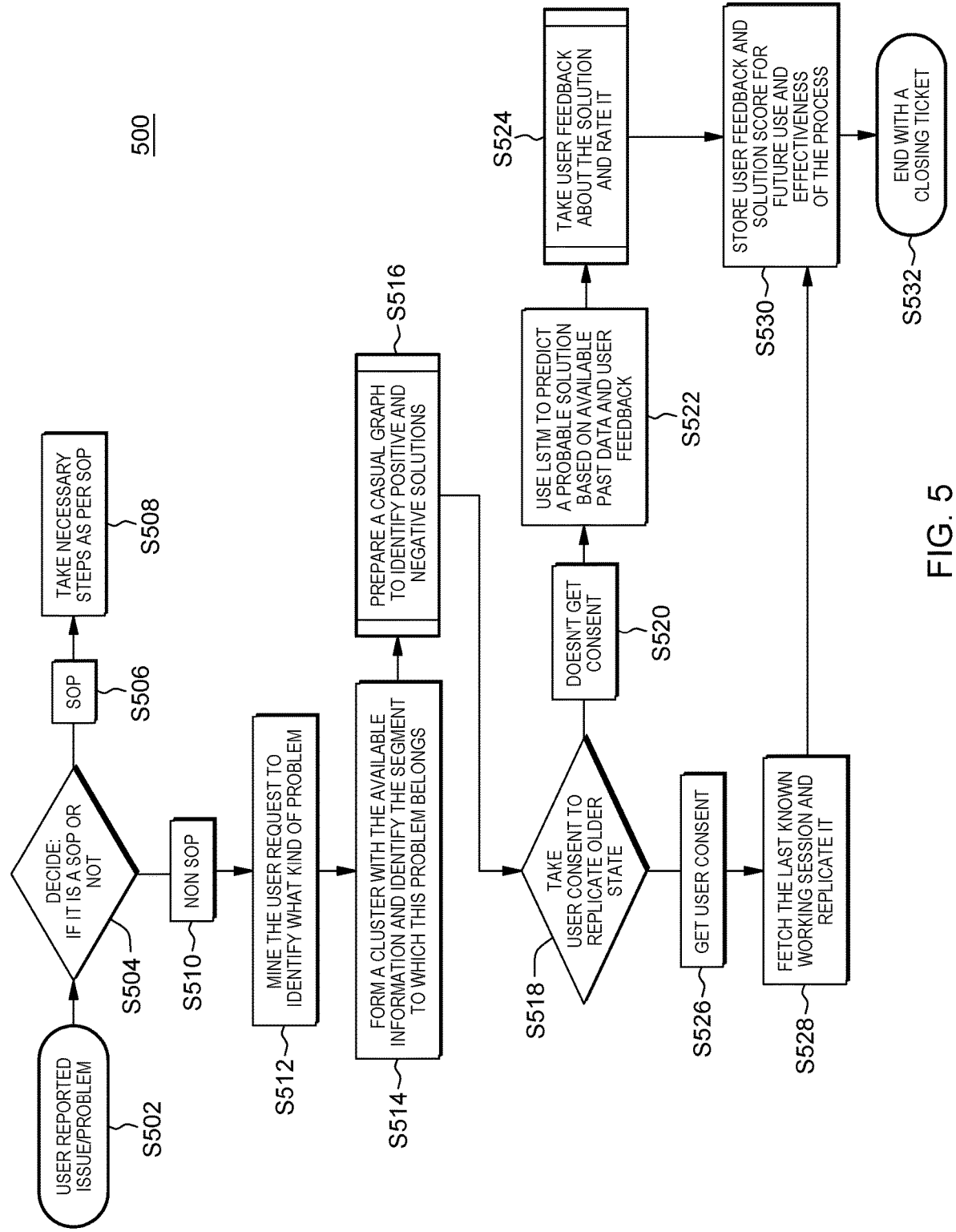
FIG. 5 is a flowchart showing a second embodiment of method according to the present invention.

As shown in FIG. 5, flowchart 500 includes: user reported issue/problem block S502; decide if it is a SOP (standard operating procedure) or not decision block S504; SOP block S506; take necessary steps as per SOP block S508; non SOP block S510; mine the user request to identify what kind of problem block S512; form a cluster with the available information and identify the segment to which this problem belongs block S514; prepare a causal graph to identify positive and negative solutions block S516; take user consent to replicate older state decision block S518; doesn't get consent block S520; use LSTM (long short-term memory) to predict a probable solution based on available past data and user feedback block S522; take user feedback about the solution and rate it block S524; get user consent block S526; fetch the last known working session and replicate it block S528; store user feedback and solution score for future use and effectiveness of the process block S530; and end with a closing ticket block S532.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
   receiving a historical incident data set with the historical incident data set including a plurality of data records respectively corresponding to historical instances of various types of incidents;
   for each given data record of the plurality of data records, applying a causal analysis algorithm to determine a set of causal factor(s) for the historical instance of an incident corresponding to the given data record to obtain a problems and solutions data set that includes a plurality of potential problems that is derived from the incidents included in the plurality of data records, a plurality of solutions derived from the plurality of records based on the causal analysis, and a plurality of mappings from the potential problems to the solutions, with the causal analysis including the following operations:
   using an unsupervised ML (machine learning) method for clustering problems into a plurality of categories,
   for each category of the plurality of categories, generating a positive causal graph where an underlying incident was resolved favorably,
   for each category of the plurality of categories, generating a negative causal graph where an underlying incident was resolved unfavorably,
   for each category of the plurality of categories, using a comparative study of the positive causal graph and the negative causal graph of category of the problem to detect the variant parts,
   for each category of the plurality of categories, identifying problem nodes, and
   for each category of the plurality of categories, applying a shortest path algorithm to detect a key resolution path that will lead all customer interaction flow to a common resolution point;
   automatically, and by machine logic, generating a chatbot that provides interactive access to the problems and solutions data set;
   receiving, by the automatically generated chatbot and from a first user, a first message indicative of a first problem that has been encountered by the first user;
   determining, by the automatically generated chatbot, that the first problem corresponds to a first potential problem of the plurality of potential problems of the problems and solutions data set;
   determining, by the automatically generated chatbot, that the first potential problem is mapped, in the problems and solutions data set, to a first category of the plurality of categories; and
   communicating, from the automatically generated chatbot and to the first user, a first key resolution path corresponding to the first category.

2. The CIM of claim 1 further comprising:
   applying, by the first user, the first key resolution path to resolve the first problem.

\* \* \* \* \*